Oct. 7, 1930.  J. BIAGI  1,777,781
AIRPLANE CYCLE
Filed May 31, 1929   2 Sheets-Sheet 1
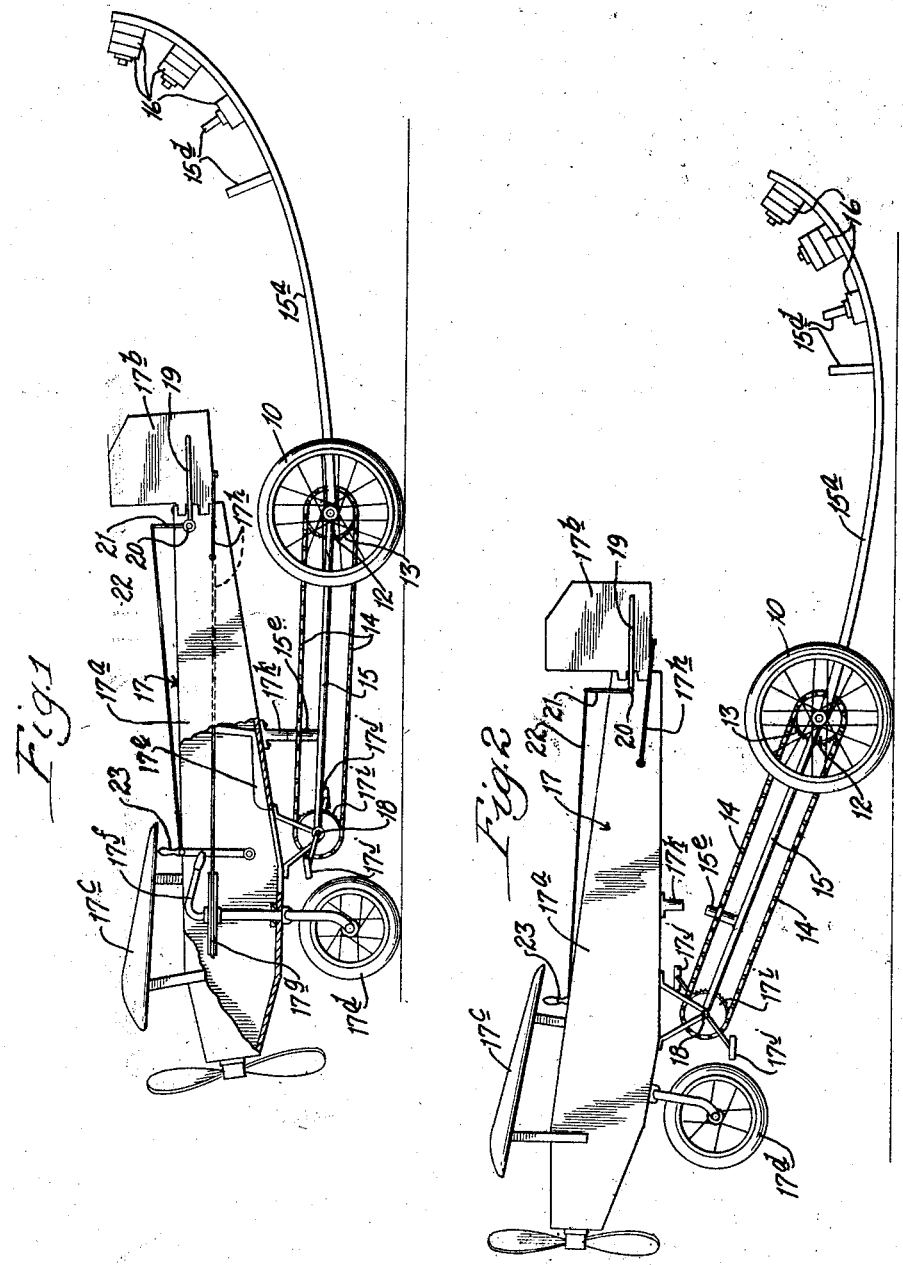
Inventor:
Joseph Biagi Oct. 7, 1930.  J. BIAGI  1,777,781
AIRPLANE CYCLE
Filed May 31, 1929    2 Sheets-Sheet 2
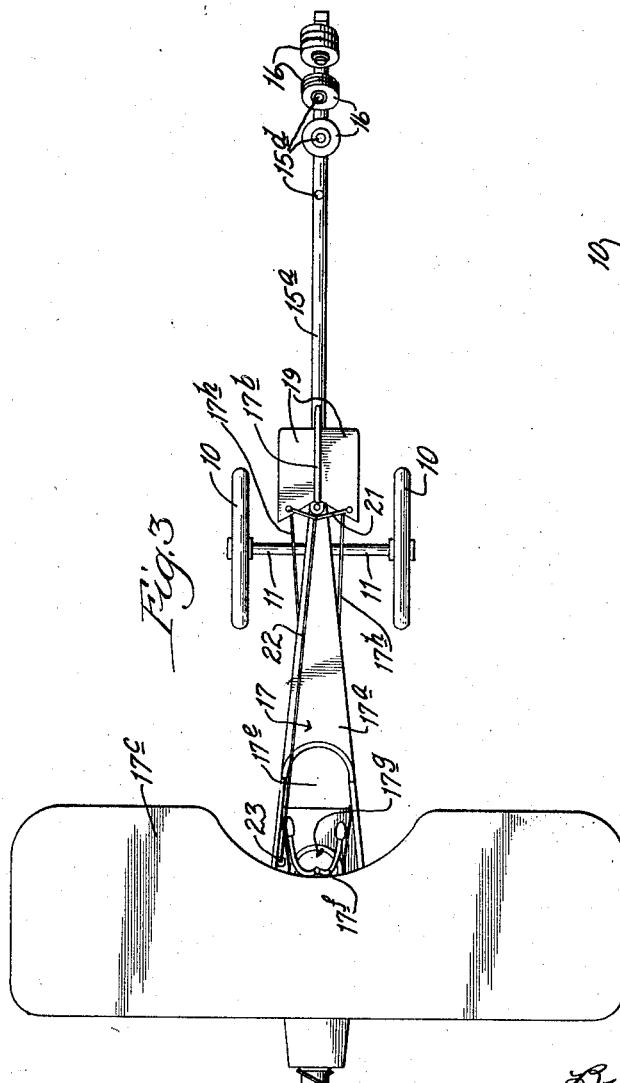
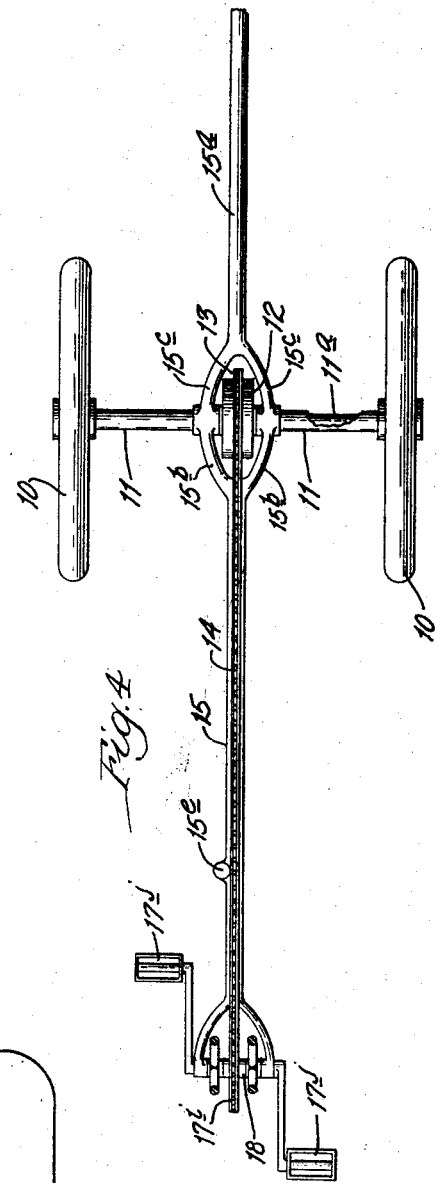
Inventor:
Joseph Biagi, Patented Oct. 7, 1930

1,777,781

UNITED STATES PATENT OFFICE

JOSEPH BIAGI, OF CHICAGO, ILLINOIS

AIRPLANE CYCLE

Application filed May 31, 1929. Serial No. 367,376.

This invention relates to improvements in airplane cycles and, more especially, such a device adapted for instruction in aeronautics or recreational use. The device may also be used as a toy or as a means of locomotion.

Among the features of my invention is the provision of such a device adapted to travel on the ground and, at the same time, give the operator the sensation of riding in and operating an airplane.

Another feature of my device is the provision of a vehicle that may be used for locomotion, recreational purposes, and for instruction in aviation. Operation of the same furnishes instructive, healthful and invigorating exercise.

Other features and advantages of my invention will appear more fully as I proceed with my specification.

In that form of device embodying the features of my invention shown in the accompanying drawings—

Figure 1 is a view, partly in section and partly in side elevation, showing the device at rest; Fig. 2 is a view in side elevation showing the device in motion; Fig. 3 is a top plan view; and Fig. 4 is a top plan view of the lower part of the apparatus.

As shown in the drawings, the device comprises primarily a traction member, a frame pivotally attached to the traction member between its ends, an airplane structure attached to one end of said frame, a counterbalance attached to the other end of said frame, and means for propelling the traction member.

Since considerable variation may be permitted in the details of the apparatus, I shall describe the various parts thereof generally, it being understood that modifications and changes may be made without departing from the spirit of my invention.

The traction member referred to may consist of any suitable arrangement of wheel or wheels, and I have here shown the same as comprising a pair of wheels 10, 10 mounted on the axle 11, said wheels adapted to be driven by means of the usual differential 12, said differential being provided with a sprocket wheel 13 engaged by the driving chain 14.

Likewise, the frame referred to, which is pivotally attached to the traction member, may be made in various forms. I have here shown the same as comprising, virtually, a long bar forked where it joins the axle 11. This frame is pivotally attached to the traction wheels between its ends. I have here indicated this frame by the reference numerals 15, $15^a$, 15 indicating the portion of the bar in front of the traction wheels 10 and $15^a$, the portion of said bar lying back of the traction wheels. Where these bars join the axle 11, they are forked, as indicated by $15^b$ and $15^c$. The pivotal attachment to the traction wheels 10 may be made as desired. For example, the axles, as indicated by 11, 11, may be tubular and attached to the ends of the forked members $15^b$ and $15^c$. Inside of the tubular axles, 11, 11 there may be driving axles to which the wheels 10, 10 are attached, the inner ends of said driving axles being connected to the differential 12 for driving. In Fig. 4, I have shown a portion of one of the tubular axles 11 broken away to disclose the driving axle $11^a$ inside. The rear end $15^a$ of the frame is preferably upwardly curved, as shown in Figs. 1 and 2, to form a sort of tail, this end being provided with upwardly projecting posts $15^d$ adapted to contain corner weights 16. The airplane structure, to be described more in detail hereinafter, is pivotally attached to the forward end of the frame 15 and it is contemplated that weights 16 shall be placed on the rear end of the frame $15^a$ to substantially counterbalance the weight of the airplane structure.

The airplane structure is also capable of great variation in design and construction. I have here indicated the same, in general, by the reference numeral 17, it being understood that this airplane structure may be of any suitable form and attached to the forward end of the frame member 15. For example, the airplane structure may include a body $17^a$, rudder $17^b$, wing or vane $17^c$, and a temporary supporting wheel $17^d$. Inside of the body is arranged an operator's seat $17^e$. The wheel $17^d$ is mounted on a vertical pivot and adapted to be turned by the handles $17^f$ adapted to be grasped by an operator sitting on the seat 17$^e$. The handles also are here shown as controlling a belt wheel 17$^g$ around which is passed a rudder rope 17$^h$ controlling the rudder 17$^b$. The chain 14 is passed around a sprocket 17$^i$ mounted beneath the body 17$^a$, said sprocket adapted to be operated by pedals 17$^j$ which, in turn, may be driven by the feet of an operator sitting on the seat 17$^e$. The airplane structure 17 is pivotally attached to the forward end of the frame rod 15 by the pivotal connection 18 which is also coincident with the axis of the sprocket 17$^i$. The frame 15 may be provided with an upwardly projecting stop member 15$^e$ adapted to engage a downwardly projecting stop member 17$^k$ on the under side of the body 17$^a$, said stop members adapted to engage to limit the angular rotation of the airplane structure 17 on the pivot 18 when the device is at rest on the ground, as shown in Fig. 1.

In operation, the device is adapted to be started, as shown in Fig. 1, with the wheels 17$^d$ and 10, 10, resting on the ground. There are sufficient weights 16 on the rear end of the frame to counterbalance a part of the weight of the airplane structure, together with the weight of the operator, but these weights preferably are not quite sufficient to raise the airplane structure from the ground. The operator is enabled to propel the device by means of the pedals 17$^j$ to move the same forwardly on the wheels. When the forward speed becomes sufficiently great, the air pressure on the under side of the wing 17$^c$ is adapted to lift the entire airplane structure from the ground to the position shown in Fig. 2, the frame pivoting on the axis of the axle of the wheels 10. It is contemplated that the forward movement of the device may be maintained by the operator by driving the wheels 10 by means of the chain, said forward movement being sufficient to cause the air pressure on the wing or vane 17$^c$ to keep the airplane structure floating (as assisted by the counterbalance) in the air. When in the air, the device may be steered by the rudder 17$^b$. If the wheel 17$^d$ is on the ground, the device may be steered by means of such wheel. It is to be noted that both the wheel 17$^d$ and the rudder 17$^b$ are turned by the handle 17$^f$. It is to be noted, also, that the driving force on the wheels 10 exerted through the chain 14 will tend, to a certain extent, to raise the airplane structure 17. Due to this tendency, the weight of the counterbalance 16 may be lessened somewhat.

The device may be provided also with the usual elevating rudder or vane 19, pivoted at 20, provided with the lever 21 controlled by the cord 22 which, in turn, is attached to the hand lever 23, the latter being used to operate the rudder 19 to change the elevation of the airplane.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in the invention as broadly as possible, in view of the prior art.

What I regard as new, and desire to secure by Letters Patent, is:

1. In a device of the character described, a traction member, a frame pivotally attached to the traction member between its ends, a structure attached to one end of said frame, a member attached to the structure angularly located to cause a planing effect to help elevate the structure when forwardly propelled, a counterbalance attached to the other end of said frame, and means for propelling said traction member.

2. In a device of the character described, a traction member, a frame pivotally attached to the traction member between its ends, a structure pivotally attached to one end of said frame, a member attached to the structure angularly located to cause a planing effect to help elevate the structure when forwardly propelled, a counterbalance attached to the other end of said frame, and means for propelling said traction member.

3. In a device of the character described, a traction member, a frame pivotally attached to the traction member between its ends, an airplane structure attached to one end of said frame, an adjustable counterbalance attached to the other end of said frame, and means for propelling said traction member.

4. In a device of the character described, a traction member, a frame pivotally attached to the traction member between its ends, an airplane structure attached to one end of said frame, a counterbalance attached to the other end of said frame, and means on the airplane structure for propelling said traction member.

5. In a device of the character described, a traction member, a frame pivotally attached to the traction member between its ends, an airplane structure attached to one end of said frame, an adjustable counterbalance attached to the other end of said frame, and means on the airplane structure for propelling said traction member.

6. In a device of the character described, a traction member, a frame pivotally attached to the traction member between its ends, an airplane structure attached to one end of said frame, a counterbalance attached to the other end of said frame, means for propelling said traction member, and an auxiliary supporting wheel on the airplane structure.

7. In a device of the character described, a traction member, a frame pivotally attached to the traction member between its ends, an airplane structure pivotally attached to one end of said frame, a counterbalance attached to the other end of said frame, means for propelling said traction member, and an auxiliary supporting wheel on the airplane structure.

8. In a device of the character described, a traction member, a frame pivotally attached to the traction member between its ends, an airplane structure attached to one end of said frame, a counterbalance attached to the other end of said frame, means on the airplane structure for propelling said traction member, and an auxiliary supporting wheel on the airplane structure.

9. In a device of the character described; a traction member; a body, provided with an operator's seat, said body being flexibly attached to the traction member, whereby said body may rise or fall with respect to said traction member; a member attached to said body angularly located to cause a planing effect to help elevate the body when forwardly propelled; means acting independently of said planing member tending to raise said body; and means for propelling the traction member.

10. In a device of the character described; a traction member; a body, provided with an operator's seat, said body being flexibly attached to the traction member, whereby said body may rise or fall with respect to said traction member; a member attached to said body angularly located to cause a planing effect to help elevate the body when forwardly propelled; means acting independently of said planing member tending to raise said body; and means on the body for propelling the traction member.

11. A device as claimed in claim 9, in which the means acting independently of the planing member and tending to raise the body includes a counterbalance.

12. A device as claimed in claim 10, in which the means acting independently of the planing member and tending to raise the body includes a counterbalance.

In witness whereof, I have hereunto set my hand and seal this 28th day of May, 1929.

JOSEPH BIAGI.